United States Patent [19]

Suda et al.

[11] Patent Number: 4,477,153
[45] Date of Patent: Oct. 16, 1984

[54] ULTRAWIDE ANGLE ZOOM OBJECTIVE

[75] Inventors: Shigeyuki Suda, Tokyo; Keiji Ikemori, Kanagawa, both of Japan

[73] Assignee: Canon Kabushiki Kaisha, Tokyo, Japan

[21] Appl. No.: 375,667

[22] Filed: May 6, 1982

[30] Foreign Application Priority Data

May 20, 1981 [JP] Japan .................................. 56-76301

[51] Int. Cl.³ ............................................. G02B 13/04
[52] U.S. Cl. .................................................. 350/426
[58] Field of Search ................ 350/426, 184, 423, 459

[56] References Cited

U.S. PATENT DOCUMENTS 4,153,339  5/1979  Tajima et al. ....................... 350/426
4,315,669  2/1982  Fujii ................................... 350/426

FOREIGN PATENT DOCUMENTS

2720443 11/1977 Fed. Rep. of Germany ...... 350/426

Primary Examiner—John K. Corbin
Assistant Examiner—Paul M. Dzierzynski
Attorney, Agent, or Firm—Toren, McGeady and Stanger

[57] ABSTRACT

Disclosed is a two-component zoom objective having a first lens component of negative power and a second lens component of positive power with the variable air separation between the first and second components effecting zooming. The aforesaid first lens component is constructed with four lenses. The first lens counting from the front is given an aspheric surface, and the air lens defined by the second and third lenses counting from the front and the four lenses in the aforesaid first lens component are appropriately configured to increase the angular field up to an ultrawide angle, while still permitting good correction of aberrations.

5 Claims, 54 Drawing Figures

FIG. 1a

WIDE ANGLE SETTING

FIG. 1b

TELEPHOTO SETTING

ULTRAWIDE ANGLE ZOOM OBJECTIVE

BACKGROUND OF THE INVENTION

1. Field of the Invention

This invention relates to wide angle zoom objectives, and more particularly to two-component zoom objectives having a first lens component of negative power and a second lens component of positive power with the air separation therebetween variable to effect a change in the focal length of the entire system.

2. Description of the Prior Art

Figure 1A:
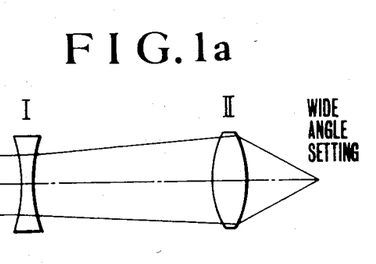
FIG. 1 is a schematic view illustrating how the two-component zoom objective is zoomed.
Figure 1B:
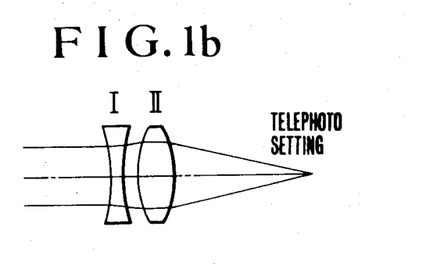
Figure 2:
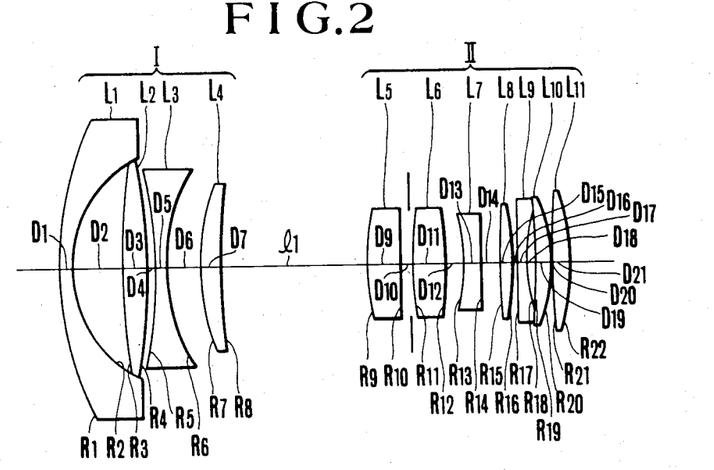
FIGS. 2 to 6 are lens block diagrams of embodiments 1 to 5 of the invention respectively.
Figure 3:
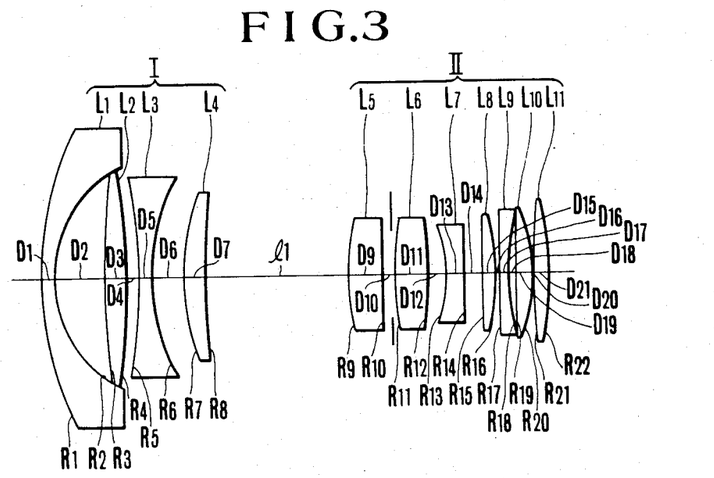
Figure 4:
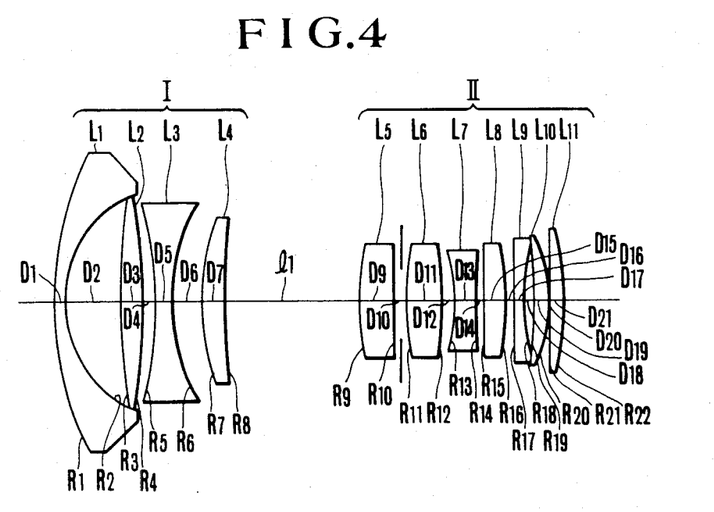
Figure 5:
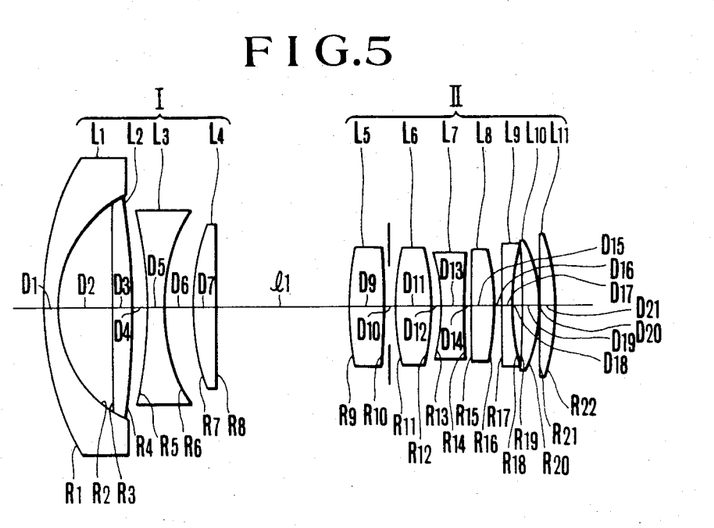
Figure 6:
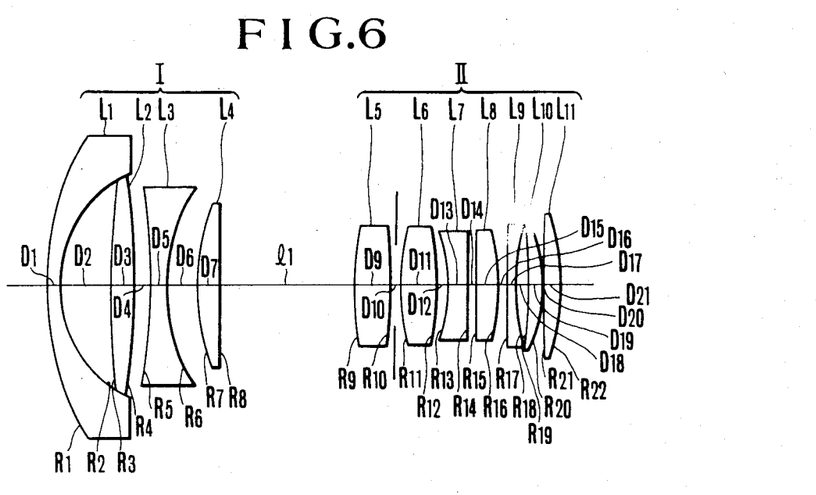

Up to now, a two-component zoom objective lens whose first component counting from the front is of negative power and whose second is of positive power as illustrated in FIG. 1, or a so-called inverted telephoto type, has represented a form of lens system offering a great advantage at an increase in the angular field. But, since the wide angle setting for the maximum possible angular field takes place when the first and second components I and II are most widely separated from each other, the diameter in the front members tends to increase as the maximum possible angular field increases. This tendency becomes prominent when a much-desired increase in the angular field is intended. With a lens system having such a wide angular field, when its bulk and size is reduced unduly, the barrel type distortion in the wide angle position increases so rapidly that correction thereof becomes very difficult to perform.

Conventionally, most wide angle two-component zoom objectives include, as the first lens L1 in the first component I, either a meniscus lens of negative power convex toward the front, or a meniscus lens of positive power convex toward the front. They contribute somewhat different advantages to their respective systems. It is generally known that, as stated in Japanese Laid Open Patent No. Sho 52-134452, the choice of the latter type is preferable to achieve good correction of distortion, and a minimization of the diameter of the front lens members is facilitated by employing the former type.

Examples of two-component wide angle zoom objectives are disclosed in U.S. Pat. Nos. 4,159,865 and 4,153,339.

SUMMARY OF THE INVENTION

The present invention is concerned with a two-component zoom objective, and aims to provide an ultrawide angle zoom objective with the front lens members of reduced diameter, while still permitting good correction of aberrations particularly regarding distortion in the wide angle position without causing this correction of distortion to deteriorate the other aberrations. For example, the spherical aberration in the telephoto position and the various aberrations in the intermediate zooming region.

According to the present invention, despite the fact that the zoom objective has an ultrawide angular field corresponding to a zoom lens having a range of 20 to 35 mm for the 35 mm single lens reflex camera, the various aberrations beginning with the distortion can be very well corrected by using a reduced number of lens elements. At the same time, a minimization of the bulk and size of the lens system as a whole can be achieved. Further since the lens system takes the mechanically-compensated form to maintain a constant image plane, the present invention has the advantage of providing an ultrawide angle zoom objective suitable for use particularly in still cameras, or in cinematographic camera or television-transmitting cameras.

One of the features of the present invention is that the ultrawide angle zoom objective is constructed such that a first lens group I of negative power and a second lens group II of positive power constitute a complete objective and are moved in differential relation to each other to effect a change in the focal length of the entire system, the aforesaid first lens group I comprises four lens elements of which the first L1 counting from the front is a meniscus lens of negative power convex toward the front, the second L2 is a bi-convex lens, the third L3 is a bi-concave lens with its rear surface of strong power, and the fourth L4 is a lens of positive power with its front surface convex towards the front, wherein the absolute value of the radius of curvature of the rear surface R4 of the aforesaid second lens L2 is made to be larger than that of the radius of curvature of the front surface R5 of the aforesaid third lens L3, and good correction of aberrations is facilitated by giving an aspheric surface to the first lens L1.

DETAILED DESCRIPTION OF THE PREFERRED EMBODIMENTS

The present invention is described in connection with embodiments 1 to 5 thereof by reference to FIGS. 2 to 8.

An important feature of the invention is the design of the two-component zoom lens such that the first lens L1 of the first lens component is configured to a negative meniscus lens to achieve a minimization of the diameter of the front lens elements. Letting R4 denote the radius of curvature of the rear surface of the second lens L2 and R5 the radius of curvature of the front surface of the third lens L3. The absolute value of R4 is made larger than that of R5 so that the air separation D4 between the second and third lenses L2 and L3 is in the form of weak divergence to perform good correction of astigmatism, and the aforesaid first lens L1 is made aspheric to reduce the distortion, so that the necessary number of constituent lens elements is lessened. An ultrawide angle zoom objective in which the angular field reaches 93° in the wide angle setting is realized. In more detail, as regards the air separation D4 between the second and third lenses L2 and L3, according to the prior art, a converging action is taken. However, when the angular field is ultrawidened up to 90° or more, the aforesaid converging action of the air lens contributes to an under-correction of curvature in the field for the meridional rays with an increase of the astigmatic difference so that the lesser number of constituent lenses no longer suffices to correct the distortion and astigmatism in good balance. According to the present invention, the aforesaid air lens is imparted with a weak diverging action to achieve good correction of astigmatism. In addition thereto, the first lens L1 which makes the largest contribution to distortional correction not only fulfills the aforesaid requirement but also has an aspheric surface, thus providing an assurance in the correction of the various aberrations.

Further, in the present invention, to correct lens aberrations for higher grade imaging performance, the following conditions are set forth:

$$0.95 < |f_2/f_1| < 1.20 \quad (i)$$

$$1.25 < |f_1/f_w| < 1.95 \quad (ii)$$

$$1 < l_w/f_w < 1.5 \quad (iii)$$

$$0.2 < \Psi < 0.35 \quad (iv)$$

$$-0.4 < \Omega < -0.05 \quad (v)$$

where $f_1$ is the focal length of the 1st lens component I;
$f_2$ is the focal length of the 2nd lens component II;
$f_w$ is the shortest focal length of the entire lens system;
$l_w$ is the distance (axial air separation) between the 1st and 2nd lens components I and II in the wide angle position;
$\Psi$ is the sum of the 3rd order coefficients of the aspheric surface applied to the 1st lens L1; and Conditions (i) to (iii) concern power distribution over the lens system. Condition (i) represents a compromise between the requirements of minimizing the bulk and size of the entire lens system and of increasing the angular field. When the lower limit of condition (i) is exceeded, the increase in the angular field exceeding 90° not only is unfeasible, but also the total length of the lens system in the wide angle position will be objectionably elongated. When the upper limit is exceeded, image aberrations cannot be stably maintained throughout the zooming range. To avoid this, it is necessary to increase the number of constituent lenses in the first lens component I that is incompatible with the minimization of the bulk and size of the lens system.

When the upper limit of condition (ii) is exceeded, it becomes difficult to achieve good correction of distortion and other various aberrations. When the lower limit is exceeded, though the aberrational problem decreases, a great increase in the bulk and size of the complete objective is involved, thus contradicting the object of obtaining a compact zoom objective. The upper limit of condition (iii) also is to minimize the bulk and size of the complete objective, and the lower limit of condition (iii) is determined to prevent a drawback in that the total zooming movement becomes too short to provide a desired zoom ratio.

Figure 7:
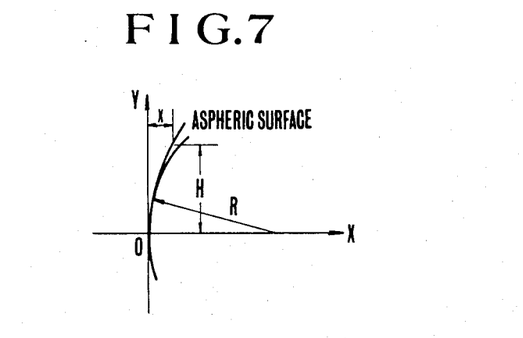
FIG. 7 is a diagram of geometry considered to define an aspheric surface.

Conditions (iv) and (v) represent factors for calculating an aspheric surface. The following is an explanation of these factors. In general, an equation for the aspheric surface is expressed as follows: In FIG. 7, putting the aspheric surface whose paraxial region has the radius of curvature R with its vertex at an original point of rectangular coordinates and taking the direction in which light advances on the optical axis as an x-axis, and the axis in a direction perpendicular to the optical axis and passing through the vertex as a y-axis, we have the deviation quantity x in the x-coordinate at H in the y-ordinate:

$$x = R\left\{1 - \sqrt{1 - \left(\frac{H}{R}\right)^2}\right\} + B^2H^4 + CH^6 + DH^8 + EH^{10} + \quad (1)$$

The first term of this equation (1) arises from only the aforesaid paraxial radius of curvature R, and the second term and those that follow give the complete information concerning the aspheric surface. Letting N denote the index of refraction of the medium ahead the aspheric surface, and N' the index of refraction of the medium behind the aspheric surface, the coefficient B in the second term is related to the third order aspheric coefficient $\Psi$ as follows:

$$\Psi = 8(N' - N)B \cdot f_w^3 \quad (2)$$

Also the coefficient C in the third term is related to the fifth order aspheric coefficient $\Omega$ as follows:

$$\Omega = 48(N' - N)C \cdot f_w^5 \quad (3)$$

Figure 8:
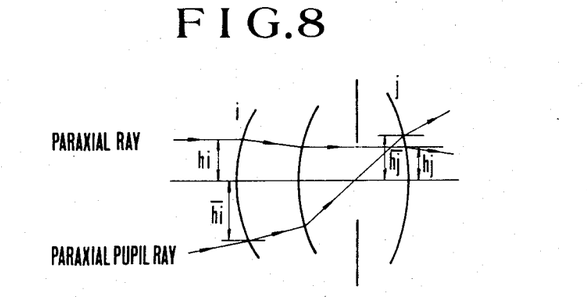
FIG. 8 is a diagram of geometry considered to define factors in paraxial formulae.
Figure 9A:
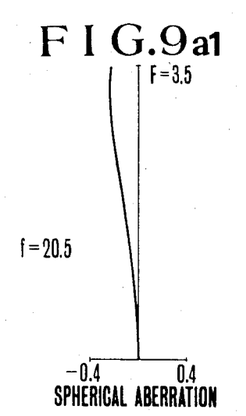
FIGS. 9 to 13 are graphic representations of the various aberrations of the objectives of FIGS. 2 to 6 respectively.
Figure 9A:
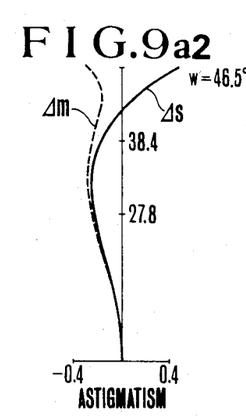
Figure 9A:
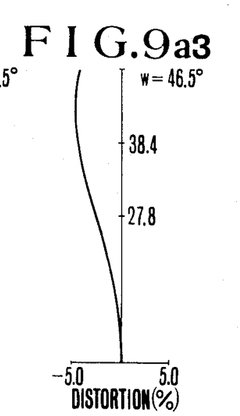
Figure 9B:
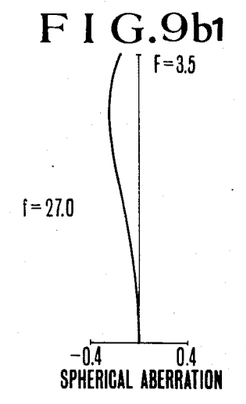
Figure 9B:
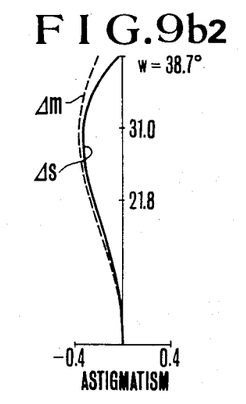
Figure 9B:
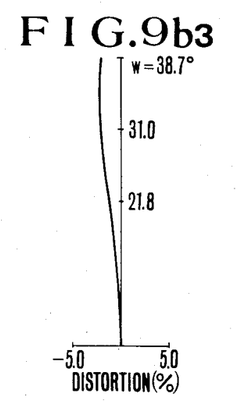
Figure 9C:
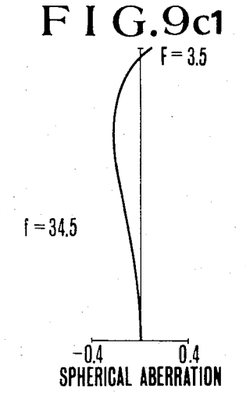
Figure 9C:
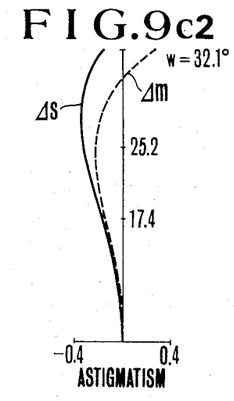
Figure 9C:
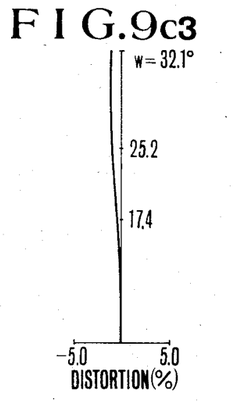
Figure 10A:
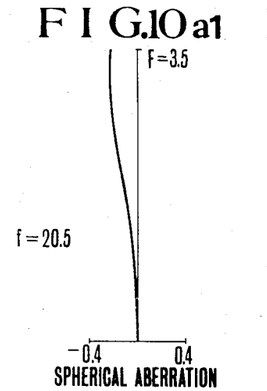
Figure 10A:
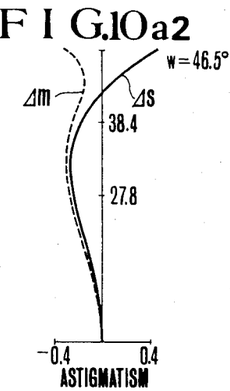
Figure 10A:
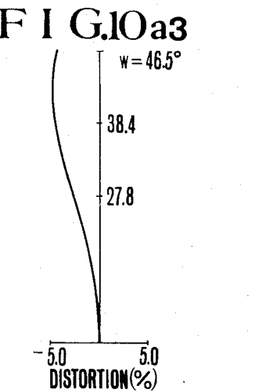
Figure 10B:
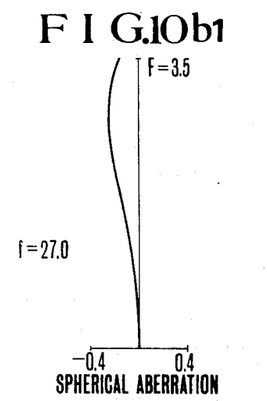
Figure 10B:
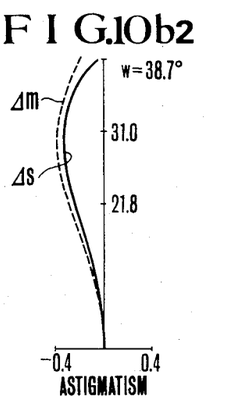
Figure 10B:
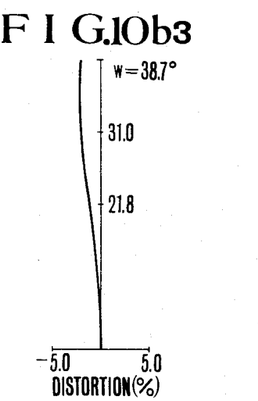
Figure 10C:
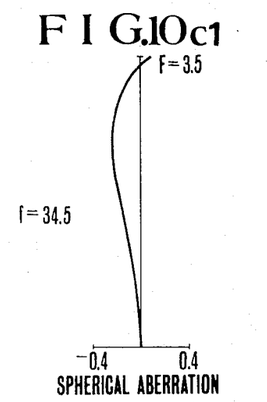
Figure 10C:
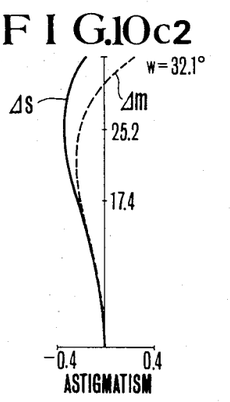
Figure 10C:
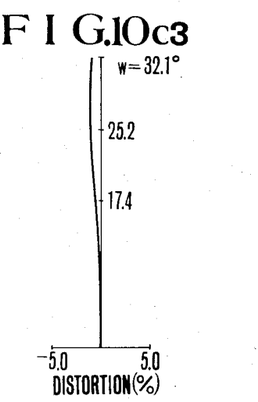
Figure 11A:
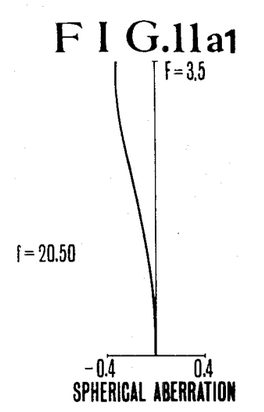
Figure 11A:
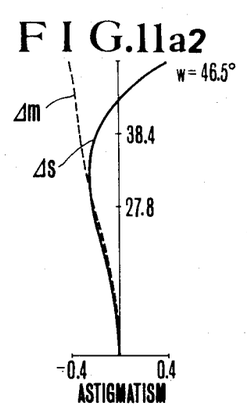
Figure 11A:
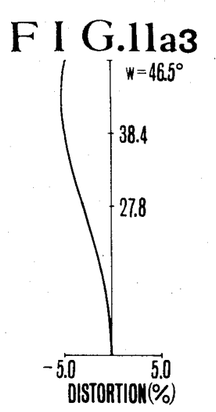
Figure 11B:
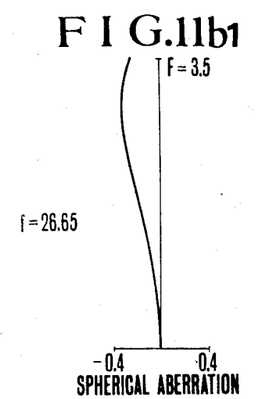
Figure 11B:
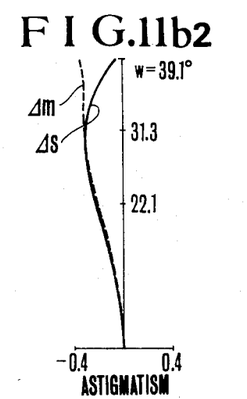
Figure 11B:
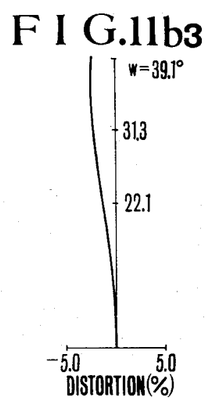
Figure 11C:
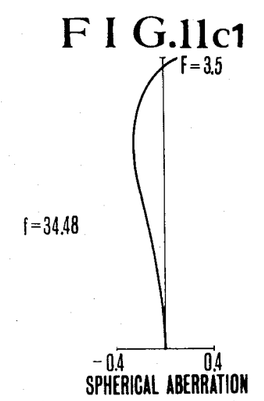
Figure 11C:
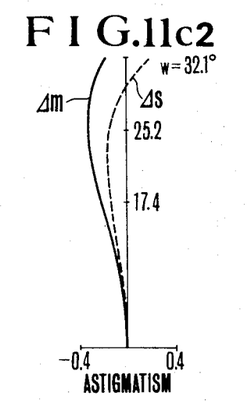
Figure 11C:
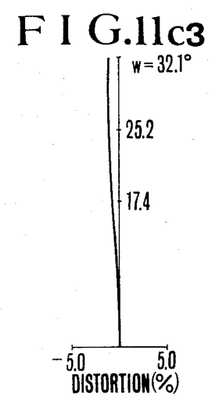
Figure 12A:
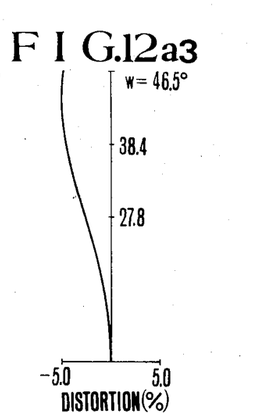
Figures 12A, 12A:
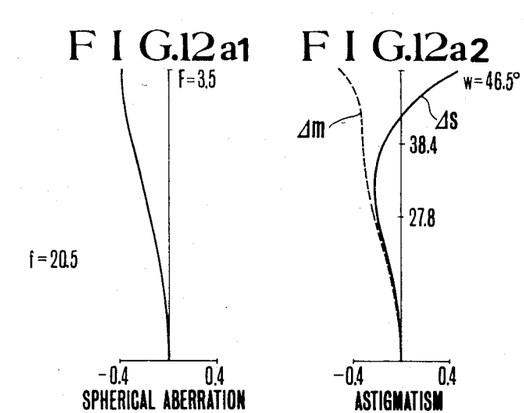
Figure 12B:
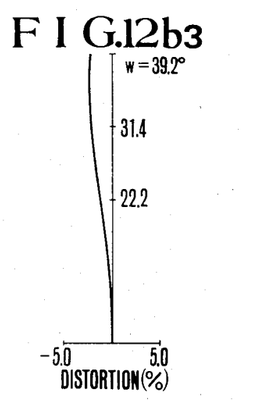
Figures 12B, 12B:
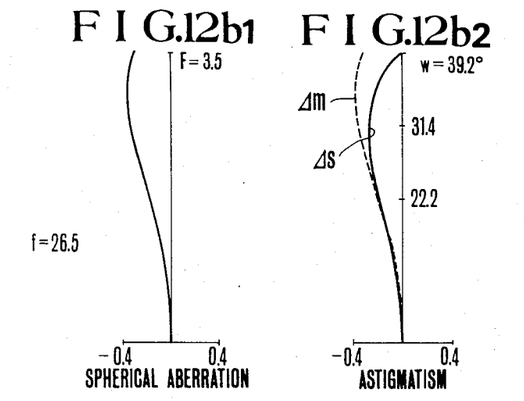
Figure 12C:
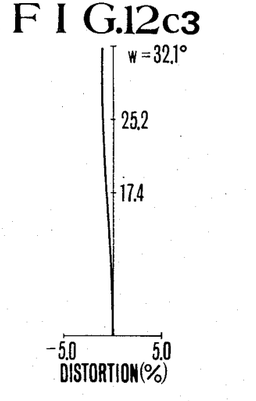
Figures 12C, 12C:
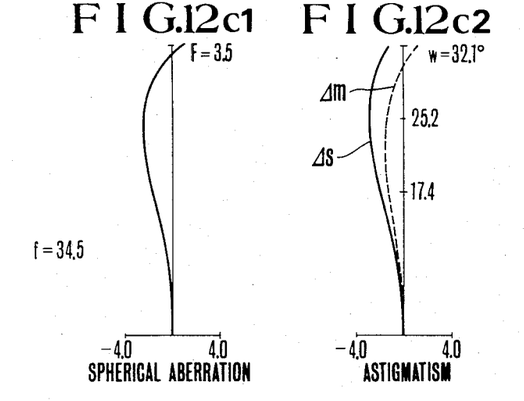
Figure 13A:
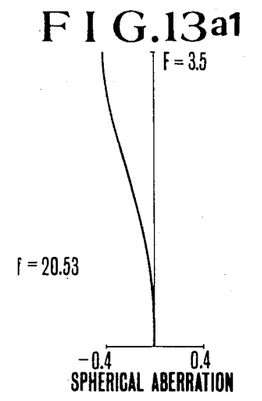
Figures 13A, 13A:
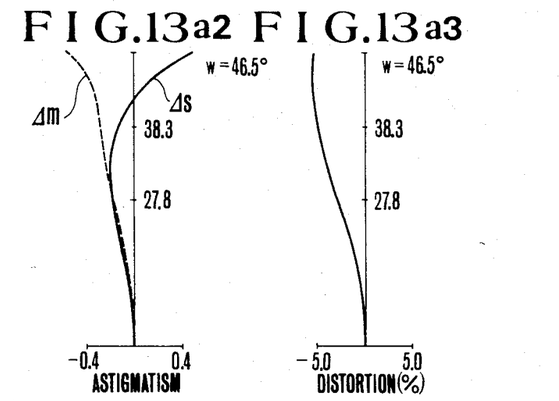
Figure 13B:
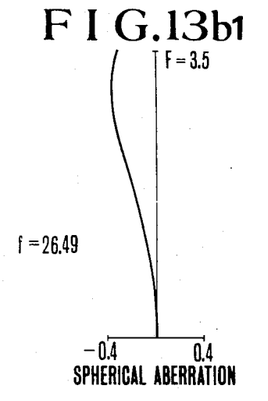
Figures 13B, 13B:
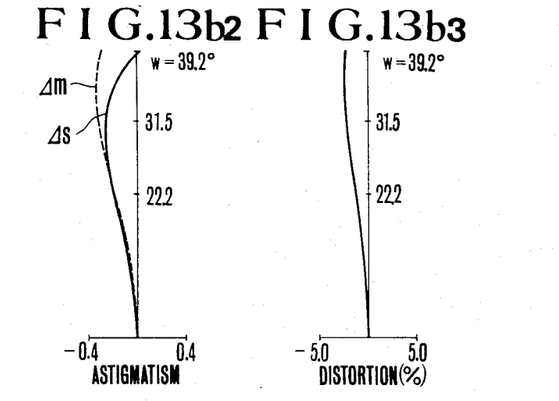
Figure 13C:
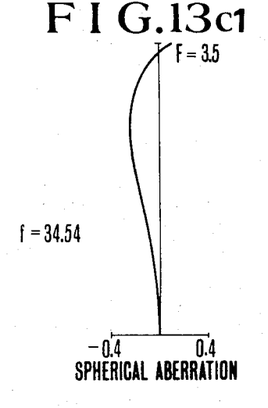
Figures 13C, 13C:
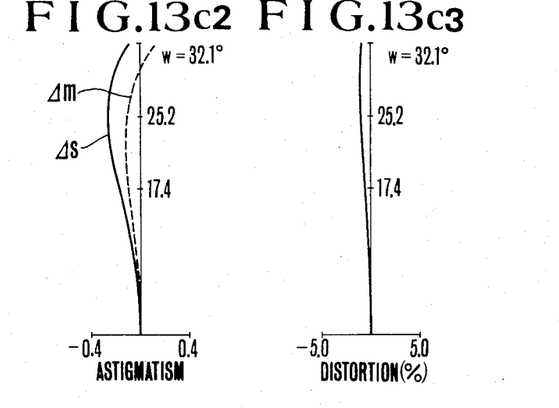

Here, the aspheric coefficient $\Psi$ contributes to the third order aberrational coefficients of the theory of spherical aberration I, coma II, astigmatism III, sagittal curvature of the field IV and distortion V the following respective changes. That is, the use of the aspheric surface results in the changes of the third order aberrations expressed as follows:

$$\Delta I = h^4 \cdot \Psi \quad (4a)$$

$$\Delta II = h^3 \cdot \bar{h} \cdot \Psi \quad (4b)$$

$$\Delta III = h^2 \cdot \bar{h}^2 \cdot \Psi \quad (4c)$$

$$\Delta IV = h^2 \cdot \bar{h}^2 \cdot \Psi \quad (4d)$$

$$\Delta V = h \cdot \bar{h}^3 \cdot \Psi \quad (4e)$$

where h and $\bar{h}$ are the quantities for use in tracing two different paraxial rays, one of which advances along the optical axis to an image point on the optical axis while cutting all the lens surfaces at heights, h, and another ray which is incident on the frontmost lens surface at an angle of inclination with the optical axis and passes through the center of the area of the diaphragm opening (paraxial pupil ray), while cutting all the lens surfaces at heights, $\bar{h}$, measured from the optical axis. Upon consideration of a certain particular lens surface, the values of the h and $\bar{h}$ in the equations (4) vary with zooming. In other words, the introduction of a certain aspheric surface figuring constant $\Psi$ leads to changing all the third order aberration coefficients by zooming.

The reason why the present invention makes use of an aspheric surface in the first lens L1 of the first lens component is, as has been stated before, to produce a great advantage in correcting the distortion in the wide angle positions which results from the increase in the angular field of, and the reduction in the bulk and size of, the lens system. And the satisfaction of conditions (iv) and (v) assures that, as the various aberrations for the telephoto positions are not adversely affected, good stability of aberration correction is maintained throughout the entire zooming range. When the lower limit of condition (iv) is exceeded, insufficient correction of distortion in the wide angle region results. When the upper limit is exceeded, aberrations other than distortion deteriorate rapidly, and it becomes difficult to correct these aberrations by lens surfaces other than the aspheric one. Particularly astigmatism varies to a very large extent with the image angle and, even in magnitude also, becomes large. Therefore, good correction of the various aberrations can be achieved within condition (iv).

Also, condition (v) is to correct mainly higher order distortion and astigmatism in good balance. That is, the fifth order distortion coefficient $\widehat{V}$ is generally taken at a negative value from the start of design, or otherwise higher order of distortion would become large barrel type distortion. Since the fifth order aspheric surface figuring constant $\Omega$ affects the $\widehat{V}$ as $$\Delta \widehat{V} = h \cdot \bar{h}^5 \Delta \Omega$$

it follows that when the $\Omega$ has a large value of negative sign, $\Delta \widehat{V} > 0$ results, causing a difficult problem of correcting higher order distortion. On the other hand, as for astigmatism, to correct higher order astigmatism to the positive direction, it is required that the following terms be of negative value $$(\widehat{III} + \widehat{III}/4) - (3III + P)^2 \cdot (f/2f_w)$$

where $\widehat{III}$ is the fifth order astigmatism coefficient, $\widehat{IV}$ is the fifth order sagittal field curvature coefficient, P is the Petzval sum and f is the overall focal length. Here, $\Omega$ affects the $\widehat{III}$ and $\widehat{IV}$ as:

$$\Delta \widehat{III} = h^2 \cdot \bar{h}^4 \cdot \Delta \Omega$$

$$\Delta \widehat{IV} = H^2 \cdot \bar{h}^4 \cdot \Delta \Omega$$

thereby offering the advantage of improving the state of correction of astigmatism which would otherwise be difficult to perform particularly in the wide angle region. Like this, the fifth order aspheric surface has reciprocal effects on the higher order distortion and astigmatism, and, therefore, correction of the various aberrations in good balance can be achieved only within condition (v).

Specific embodiments 1 to 5 of the present invention which have satisfied the foregoing conditions can be constructed in accordance with the following numerical data for the radii of curvature, R, the axial thicknesses and air separations, D and l1, and the refractive indices, N, of, and the Abbe numbers, $\nu$, of, the glasses of the lens elements, which are all expressed with the subscripts numbered from front to rear.

Embodiment 1

| | | | | | | | |
|---|---|---|---|---|---|---|---|
| $R_1 =$ | 72.90 | $D_1 =$ | 2.10 | $N_1 =$ | 1.72342 | $\nu_1 =$ | 38.0 |
| $R_2 =$ | 20.24 | $D_2 =$ | 8.89 | | | | |
| $R_3 =$ | 128.58 | $D_3 =$ | 3.78 | $N_2 =$ | 1.59551 | $\nu_2 =$ | 39.2 |
| $R_4 =$ | −109.49 | $D_4 =$ | 1.94 | | | | |
| $R_5 =$ | −81.11 | $D_5 =$ | 1.94 | $N_3 =$ | 1.77250 | $\nu_3 =$ | 49.6 |
| $R_6 =$ | 33.06 | $D_6 =$ | 5.90 | | | | |
| $R_7 =$ | 41.42 | $D_7 =$ | 3.55 | $N_4 =$ | 1.80518 | $\nu_4 =$ | 25.4 |
| $R_8 =$ | 234.15 | $l_1$ | | | | | |
| $R_9 =$ | 44.81 | $D_9 =$ | 5.85 | $N_5 =$ | 1.77250 | $\nu_5 =$ | 49.6 |
| $R_{10} =$ | −398.69 | $D_{10} =$ | 2.00 | | | | |
| $R_{11} =$ | 56.82 | $D_{11} =$ | 5.85 | $N_6 =$ | 1.80610 | $\nu_6 =$ | 40.9 |
| $R_{12} =$ | −63.65 | $D_{12} =$ | 2.88 | | | | |
| $R_{13} =$ | −27.40 | $D_{13} =$ | 3.06 | $N_7 =$ | 1.84666 | $\nu_7 =$ | 23.9 |
| $R_{14} =$ | 559.54 | $D_{14} =$ | 3.26 | | | | |
| $R_{15} =$ | 415.00 | $D_{15} =$ | 2.36 | $N_8 =$ | 1.61800 | $\nu_8 =$ | 63.4 |
| $R_{16} =$ | −47.28 | $D_{16} =$ | 0.66 | | | | |
| $R_{17} =$ | −1900.55 | $D_{17} =$ | 1.60 | $N_9 =$ | 1.83400 | $\nu_9 =$ | 37.2 |

Embodiment 1-continued

| | | | | | | | |
|---|---|---|---|---|---|---|---|
| $R_{18} =$ | 31.95 | $D_{18} =$ | 1.51 | | | | |
| $R_{19} =$ | −314.71 | $D_{19} =$ | 2.81 | $N_{10} =$ | 1.49700 | $\nu_{10} =$ | 81.6 |
| $R_{20} =$ | −26.03 | $D_{20} =$ | 0.10 | | | | |
| $R_{21} =$ | 187.39 | $D_{21} =$ | 2.85 | $N_{11} =$ | 1.48749 | $\nu_{11} =$ | 70.1 |
| $R_{22} =$ | −47.90 | | | | | | |

| | f = 20.5 | f = 27 | f = 34.5 |
|---|---|---|---|
| $l_1$ | 25.31 | 11.19 | 1.51 |

Aspheric Surface Figuring Constants for first Surface

| | |
|---|---|
| B = | $5.52 \times 10^{-6}$ |
| C = | $-3.09 \times 10^{-9}$ |
| D = | $4.57 \times 10^{-12}$ |
| E = | $-1.16 \times 10^{-15}$ |
| $f_1 =$ | −33.67 |
| $f_2 =$ | 35.71 |

Embodiment 2

| | | | | | | | |
|---|---|---|---|---|---|---|---|
| $R_1 =$ | 70.07 | $D_1 =$ | 2.10 | $N_1 =$ | 1.72342 | $\nu_1 =$ | 38.0 |
| $R_2 =$ | 20.10 | $D_2 =$ | 8.89 | | | | |
| $R_3 =$ | 149.05 | $D_3 =$ | 3.78 | $N_2 =$ | 1.59551 | $\nu_2 =$ | 39.2 |
| $R_4 =$ | −105.86 | $D_4 =$ | 1.94 | | | | |
| $R_5 =$ | −83.21 | $D_5 =$ | 1.94 | $N_3 =$ | 1.77250 | $\nu_3 =$ | 49.6 |
| $R_6 =$ | 32.87 | $D_6 =$ | 5.90 | | | | |
| $R_7 =$ | 41.09 | $D_7 =$ | 3.55 | $N_4 =$ | 1.80518 | $\nu_4 =$ | 25.4 |
| $R_8 =$ | 223.27 | $l_1$ | | | | | |
| $R_9 =$ | 44.57 | $D_9 =$ | 5.85 | $N_5 =$ | 1.77250 | $\nu_5 =$ | 49.6 |
| $R_{10} =$ | −358.59 | $D_{10} =$ | 2.00 | | | | |
| $R_{11} =$ | 57.24 | $D_{11} =$ | 5.85 | $N_6 =$ | 1.80610 | $\nu_6 =$ | 40.9 |
| $R_{12} =$ | −63.91 | $D_{12} =$ | 2.88 | | | | |
| $R_{13} =$ | −27.34 | $D_{13} =$ | 3.06 | $N_7 =$ | 1.84666 | $\nu_7 =$ | 23.9 |
| $R_{14} =$ | 591.72 | $D_{14} =$ | 3.26 | | | | |
| $R_{15} =$ | 707.20 | $D_{15} =$ | 2.36 | $N_8 =$ | 1.61800 | $\nu_8 =$ | 63.4 |
| $R_{16} =$ | −47.11 | $D_{16} =$ | 0.66 | | | | |
| $R_{17} =$ | −1883.81 | $D_{17} =$ | 1.60 | $N_9 =$ | 1.83400 | $\nu_9 =$ | 37.2 |
| $R_{18} =$ | 32.14 | $D_{18} =$ | 1.38 | | | | |
| $R_{19} =$ | −657.36 | $D_{19} =$ | 2.89 | $N_{10} =$ | 1.49700 | $\nu_{10} =$ | 81.6 |
| $R_{20} =$ | −26.00 | $D_{20} =$ | 0.10 | | | | |
| $R_{21} =$ | 234.25 | $D_{21} =$ | 2.65 | $N_{11} =$ | 1.48749 | $\nu_{11} =$ | 70.1 |
| $R_{22} =$ | −47.96 | | | | | | |

| | f = 20.5 | f = 27 | f = 34.5 |
|---|---|---|---|
| $l_1$ | 25.13 | 11.18 | 1.61 |

Aspheric Surface Figuring Constants for first Surface

| | |
|---|---|
| B = | $5.38 \times 10^{-6}$ |
| C = | $-2.93 \times 10^{-9}$ |
| D = | $4.37 \times 10^{-12}$ |
| E = | $-9.41 \times 10^{-16}$ |
| $f_1 =$ | −33.39 |
| $f_2 =$ | 35.58 |

Embodiment 3

| | | | | | | | |
|---|---|---|---|---|---|---|---|
| $R_1 =$ | 65.30 | $D_1 =$ | 2.10 | $N_1 =$ | 1.69680 | $\nu_1 =$ | 55.5 |
| $R_2 =$ | 19.79 | $D_2 =$ | 9.04 | | | | |
| $R_3 =$ | 217.50 | $D_3 =$ | 3.49 | $N_2 =$ | 1.60311 | $\nu_2 =$ | 60.7 |
| $R_4 =$ | −93.53 | $D_4 =$ | 2.17 | | | | |
| $R_5 =$ | −70.55 | $D_5 =$ | 2.89 | $N_3 =$ | 1.78590 | $\nu_3 =$ | 44.2 |
| $R_6 =$ | 31.34 | $D_6 =$ | 5.15 | | | | |
| $R_7 =$ | 40.34 | $D_7 =$ | 3.62 | $N_4 =$ | 1.80518 | $\nu_4 =$ | 25.4 |
| $R_8 =$ | 400.48 | $l_1$ | | | | | |
| $R_9 =$ | 45.58 | $D_9 =$ | 5.85 | $N_5 =$ | 1.77250 | $\nu_5 =$ | 49.6 |
| $R_{10} =$ | −263.00 | $D_{10} =$ | 2.00 | | | | |
| $R_{11} =$ | 53.88 | $D_{11} =$ | 5.85 | $N_6 =$ | 1.80610 | $\nu_6 =$ | 40.9 |
| $R_{12} =$ | −55.05 | $D_{12} =$ | 2.14 | | | | |
| $R_{13} =$ | −27.41 | $D_{13} =$ | 3.61 | $N_7 =$ | 1.84666 | $\nu_7 =$ | 23.9 |
| $R_{14} =$ | 246.01 | $D_{14} =$ | 1.32 | | | | |
| $R_{15} =$ | −1209.01 | $D_{15} =$ | 3.65 | $N_8 =$ | 1.60311 | $\nu_8 =$ | 60.7 |
| $R_{16} =$ | −49.48 | $D_{16} =$ | 1.42 | | | | |
| $R_{17} =$ | 436.16 | $D_{17} =$ | 1.70 | $N_9 =$ | 1.83400 | $\nu_9 =$ | 37.2 |
| $R_{18} =$ | 31.96 | $D_{18} =$ | 1.63 | | | | |
| $R_{19} =$ | −146.93 | $D_{19} =$ | 2.44 | $N_{10} =$ | 1.48749 | $\nu_{10} =$ | 70.1 |
| $R_{20} =$ | −24.71 | $D_{20} =$ | 0.10 | | | | |
| $R_{21} =$ | 305.07 | $D_{21} =$ | 2.69 | $N_{11} =$ | 1.48749 | $\nu_{11} =$ | 70.1 |

Embodiment 3-continued $R_{22} =$ −39.35

| | $f = 20.5$ | $f = 26.65$ | $f = 34.48$ |
|---|---|---|---|
| $l_1$ | 22.92 | 10.32 | 0.78 |

Aspheric Surface Figuring Constants for first Surface

| | |
|---|---|
| B = | $5.42 \times 10^{-6}$ |
| C = | $-2.27 \times 10^{-9}$ |
| D = | $4.11 \times 10^{-12}$ |
| E = | $-4.47 \times 10^{-16}$ |
| $f_1 =$ | −32.40 |
| $f_2 =$ | 34.55 |

Embodiment 4

| | | | | | | | |
|---|---|---|---|---|---|---|---|
| $R_1 =$ | 61.22 | $D_1 =$ | 2.10 | $N_1 =$ | 1.69680 | $\nu_1 =$ | 55.5 |
| $R_2 =$ | 19.81 | $D_2 =$ | 9.03 | | | | |
| $R_3 =$ | 364.20 | $D_3 =$ | 3.49 | $N_2 =$ | 1.60311 | $\nu_2 =$ | 60.7 |
| $R_4 =$ | −102.73 | $D_4 =$ | 2.42 | | | | |
| $R_5 =$ | −78.86 | $D_5 =$ | 2.42 | $N_3 =$ | 1.77250 | $\nu_3 =$ | 49.6 |
| $R_6 =$ | 28.18 | $D_6 =$ | 4.99 | | | | |
| $R_7 =$ | 37.11 | $D_7 =$ | 3.62 | $N_4 =$ | 1.74000 | $\nu_4 =$ | 28.3 |
| $R_8 =$ | 645.86 | $l_1$ | | | | | |
| $R_9 =$ | 49.21 | $D_9 =$ | 5.85 | $N_5 =$ | 1.77250 | $\nu_5 =$ | 49.6 |
| $R_{10} =$ | −194.70 | $D_{10} =$ | 2.00 | | | | |
| $R_{11} =$ | 48.30 | $D_{11} =$ | 5.85 | $N_6 =$ | 1.80610 | $\nu_6 =$ | 40.9 |
| $R_{12} =$ | −50.01 | $D_{12} =$ | 1.73 | | | | |
| $R_{13} =$ | −28.55 | $D_{13} =$ | 3.56 | $N_7 =$ | 1.84666 | $\nu_7 =$ | 23.9 |
| $R_{14} =$ | 174.26 | $D_{14} =$ | 1.32 | | | | |
| $R_{15} =$ | 1143.68 | $D_{15} =$ | 3.65 | $N_8 =$ | 1.51633 | $\nu_8 =$ | 64.1 |
| $R_{16} =$ | −56.74 | $D_{16} =$ | 1.42 | | | | |
| $R_{17} =$ | 388.24 | $D_{17} =$ | 1.70 | $N_9 =$ | 1.83400 | $\nu_9 =$ | 37.2 |
| $R_{18} =$ | 31.03 | $D_{18} =$ | 1.85 | | | | |
| $R_{19} =$ | −108.43 | $D_{19} =$ | 2.44 | $N_{10} =$ | 1.48749 | $\nu_{10} =$ | 70.1 |
| $R_{20} =$ | −23.81 | $D_{20} =$ | 0.10 | | | | |
| $R_{21} =$ | 270.05 | $D_{21} =$ | 2.59 | $N_{11} =$ | 1.48749 | $\nu_{11} =$ | 70.1 |
| $R_{22} =$ | −38.65 | | | | | | |

| | $f = 20.5$ | $f = 26.5$ | $f = 34.5$ |
|---|---|---|---|
| $l_1$ | 22.22 | 10.38 | 1.12 |

Aspheric Surface Figuring Constants for first Surface

| | |
|---|---|
| B = | $5.19 \times 10^{-6}$ |
| C = | $-1.23 \times 10^{-9}$ |
| D = | $1.87 \times 10^{-12}$ |
| E = | $1.66 \times 10^{-15}$ |
| $f_1 =$ | −31.21 |
| $f_2 =$ | 34.15 |

Embodiment 5

| | | | | | | | |
|---|---|---|---|---|---|---|---|
| $R_1 =$ | 61.82 | $D_1 =$ | 2.10 | $N_1 =$ | 1.69680 | $\nu_1 =$ | 55.5 |
| $R_2 =$ | 19.91 | $D_2 =$ | 8.61 | | | | |
| $R_3 =$ | 221.15 | $D_3 =$ | 3.49 | $N_2 =$ | 1.60311 | $\nu_2 =$ | 60.7 |
| $R_4 =$ | −116.52 | $D_4 =$ | 2.74 | | | | |
| $R_5 =$ | −78.55 | $D_5 =$ | 2.74 | $N_3 =$ | 1.77250 | $\nu_3 =$ | 49.6 |
| $R_6 =$ | 27.78 | $D_6 =$ | 4.99 | | | | |
| $R_7 =$ | 36.86 | $D_7 =$ | 3.62 | $N_4 =$ | 1.74000 | $\nu_4 =$ | 28.3 |
| $R_8 =$ | 560.95 | $l_1$ | | | | | |
| $R_9 =$ | 52.81 | $D_9 =$ | 5.85 | $N_5 =$ | 1.77250 | $\nu_5 =$ | 49.6 |
| $R_{10} =$ | −180.26 | $D_{10} =$ | 2.00 | | | | |
| $R_{11} =$ | 45.53 | $D_{11} =$ | 5.85 | $N_6 =$ | 1.80610 | $\nu_6 =$ | 40.9 |
| $R_{12} =$ | −49.23 | $D_{12} =$ | 1.76 | | | | |
| $R_{13} =$ | −28.49 | $D_{13} =$ | 3.56 | $N_7 =$ | 1.84666 | $\nu_7 =$ | 23.9 |
| $R_{14} =$ | 178.87 | $D_{14} =$ | 1.32 | | | | |
| $R_{15} =$ | −844.90 | $D_{15} =$ | 3.65 | $N_8 =$ | 1.51633 | $\nu_8 =$ | 64.1 |
| $R_{16} =$ | −49.24 | $D_{16} =$ | 1.42 | | | | |
| $R_{17} =$ | 592.57 | $D_{17} =$ | 1.70 | $N_9 =$ | 1.83400 | $\nu_9 =$ | 37.2 |
| $R_{18} =$ | 31.12 | $D_{18} =$ | 1.85 | | | | |
| $R_{19} =$ | −101.35 | $D_{19} =$ | 2.44 | $N_{10} =$ | 1.48749 | $\nu_{10} =$ | 70.1 |
| $R_{20} =$ | −23.65 | $D_{20} =$ | 0.10 | | | | |
| $R_{21} =$ | 251.04 | $D_{21} =$ | 2.59 | $N_{11} =$ | 1.48749 | $\nu_{11} =$ | 70.1 |
| $R_{22} =$ | −39.70 | | | | | | |

| | $f = 20.53$ | $f = 26.49$ | $f = 34.54$ |
|---|---|---|---|

Embodiment 5-continued

| $l_1$ | 22.23 | 10.64 | 1.31 |
|---|---|---|---|

Aspheric Surface Figuring Constants for first Surface

| | |
|---|---|
| B = | $5.19 \times 10^{-6}$ |
| C = | $-1.23 \times 10^{-9}$ |
| D = | $1.87 \times 10^{-12}$ |
| E = | $1.66 \times 10^{-15}$ |
| $f_1 =$ | −31.11 |
| $f_2 =$ | 34.04 |

What is claimed is:

1. An ultrawide angle zoom objective having the following conditions:
   two lens components of which the first counting from the front is of negative power and the second is of positive power;
   an air separation between said first and said second lens components being made variable to effect zooming,
   said first lens component consisting of four lens elements from front to rear, the first being frontmost and the fourth being rearmost,
   the first lens element being a meniscus lens of negative power convex toward the front,
   the second lens element being a bi-convex lens,
   the third lens element being a bi-concave lens with its rear surface having a stronger refractive power,
   the fourth lens element being a lens of positive power with its front surface convex toward the front,
   the absolute value of the radius of curvature of the rear surface of said second lens being larger than the absolute value of the radius of curvature of the front surface of said third lens, and
   said first lens element having an aspheric surface.

2. An ultrawide angle zoom objective according to claim 1, satisfying the following condition:

$$|f_1| < f_T$$

where $f_1$ is the focal length of said lens component, and $f_T$ is the longest focal length of the entire lens system.

3. An ultrawide angle zoom objective comprising two lens components of which the first counting from the front is of negative power and the second is of positive power;
   an air separation between said first and said second lens components being made variable to effect zooming,
   said first lens component consisting of four lenses from front to rear, the first being frontmost and the fourth being rearmost,
   the first lens being a meniscus lens of negative power convex toward the front,
   the second lens being a bi-convex lens,
   the third lens being a bi-concave lens with its rear surface having a stronger refractive power,
   the fourth lens being a lens of positive power with its front surface convex toward the front,
   the absolute value of the radius of curvature of the rear surface of said second lens being larger than the absolute value of the radius of curvature of the front surface of said third lens, and
   said first lens having an aspheric surface and further satisfying the following conditions:

$$0.95 < |f_2/f_1| < 1.20$$

$$1.25 < |f_1/f_w| < 1.95$$

$$1 < l_w/f_w < 1.5$$

where
- $f_1$ is the focal length of said 1st lens component;
- $f_2$ is the focal length of said 2nd lens component;
- $f_w$ is the shortest focal length of the entire system; and
- $l_w$ is the distance (air separation) between said 1st and said 2nd lens components in the wide angle position.

4. An ultrawide angle zoom objective comprising two lens components of which the first counting from the front is of negative power and the second is of positive power;

an air separation between said first and said second lens components being made variable to effect zooming, said first lens component consisting of four lenses from front to rear, the first being frontmost and the fourth being rearmost, the first lens being a meniscus lens of negative power convex toward the front, the second lens being a bi-convex lens, the third lens being a bi-concave lens with its rear surface having a stronger refractive power, the fourth lens being a lens of positive power with its front surface convex toward the front, the absolute value of the radius of curvature of the rear surface of said second lens being larger than the absolute value of the radius of curvature of the front surface of said third lens, and said first lens having an aspheric surface and further satisfying the following conditions:

$$0.2 < \Psi < 0.35$$

$$-0.4 < \Omega < -0.05$$

wherein
- $\Psi$ is the sum of the third order aspheric surface coefficients applied to the first lens; and
- $\Omega$ is the sum of the fifth order aspheric surface coefficients applied to the first lens.

5. An ultrawide angle zoom objective according to claim 3, wherein
- $\Psi$ is the sum of the third order aspheric surface coefficients applied to the first lens; and
- $\Omega$ is the sum of the fifth order aspheric surface coefficients applied to the first lens.

* * * * *